United States Patent Office 3,196,073
Patented July 20, 1965

3,196,073
METHOD OF TRANQUILIZING WITH 1,2-DIHYDROXY PROPANE
Maynard B. Chenoweth, Midland, Mich., and Leland C. Hendershot, Evanston, Ill., assignors to The Dow Chemical Company, Midland, Mich., a corporation of Delaware
No Drawing. Filed Mar. 16, 1961, Ser. No. 96,092
6 Claims. (Cl. 167—53)

The present invention is concerned with the control of anxiety in warm-blooded animals and is particularly directed to a new and improved method of tranquilizing an animal which, in the absence of tranquilizing treatment, would be disadvantageously anxious, apprehensive, or restless.

Many medicinal substances are known which usefully modify the mental or psychological state of the animal treated therewith. In a primitive sense, many drugs were known which more or less harmlessly induced sleep in the subject treated with them. As pharmacological investigations became more sophisticated, it was noted that many drugs obtund the sense of pain without inducing sleep. Such substances are commonly called analgesics.

To this pharmaceutical armamentum there have more recently been added agents which induce the phenomenon of ataraxis or "tranquilization," by which is meant the relief of the higher neural centers of the organism from the disordering effect of otherwise anxiety producing experimential stimuli.

Pharmaceutical substances employed to induce ataraxis seldom induce this condition in the total absence of such related phenomena as analgesia, narcosis, and anesthesia; however, a predominance, even an almost total predominance of ataraxis over such other phenomena is caused by numerous pharmaceutical agents. Such agents are, for the most part, chemical substances of considerable complexity and expense for which few other uses are known, with the result that relatively expensive medication has been required in the intentional induction of ataraxis.

Aside from its well known employment in human medication including clinical and subclinical psychiatric and psychotherapeutic treatment, ataractic medication has become well established in veterinary and related medical practice. Thus, for example, in the hospitalization of small animals such as dogs and cats, anxiety due to the imposition of unusual surroundings frequently interferes with otherwise favorable courses of medical care. Similarly, it is common veterinary experience that small animals may resist or be made anxious even to the point of violent effort by preoperative preparations, palpitation, and like medical procedures. Also, it is common veterinary experience that animals of many kinds from small fur bearers to such large animals as feral beasts in zoological gardens, stallions and bulls at stud, and the like may be excited with harmful results to themselves by the occurrence of such essentially harmless incidents as visits by strangers, pest control procedures, changes in handling routine, and especially such disturbing experiences as shipment, as by rail or truck, to new locations. Such shipment is commonly associated with major emotional disturbance of animals with such results as loss of weight, intractability to handlers and the like.

While the use of certain ataractic agents has found limited application in the management of animals, such application has commonly been limited by various factors. Many of the ataractic substances are too expensive. Some of them are difficult to administer.

Accordingly it is an object of the present invention to provide a new ataractic agent. It is a further object of the present invention to provide an ataractic agent which is relatively low in price. Yet a further object of the present invention is to provide an ataractic agent which may readily be administered in effective amounts in techniques which do not usually arouse resistance to animals in which the ataractic action is desired. A further object is to provide ataraxis without undesired sequelae. Other objects appear in the instant specification.

According to the present invention, it has been discovered that the dextrorotatory optical isomer of 1,2-propanediol is a highly effective ataractic agent. The efficacy of this substance is not impaired by the presence, with it, of the laevorotatory isomer, as in a racemic mixture. However, the laevorotatory isomer is virtually without the said ataractic action and may be regarded as a diluent which, at the employed dosages, is essentially without biological effect. In brief, the present invention is described as a method of tranquilizing a warm-blooded animal in a state of at least incipient excitement which comprises the step of administering to such animal, propylene glycol in a non-toxic amount sufficient to contain at least 0.25 gram of the dextrorotatory optical isomer of 1,2-propanediol per kilogram body weight of the said animal. In a satisfactory embodiment, the glycol is supplied as a mixture of the dextrorotatory and laevorotatory optical isomers. Because the employed substance is inexpensive, a preferred embodiment is one in which the glycol is supplied as a racemic mixture of the dextrorotatory and laevorotatory optical isomers. The invention is practiced with doses of minimum bulk when the glycol is supplied as the essentially pure dextrorotatory isomer.

The substance is successfully administered in conventional techniques of oral medication. It is also successfully administered in drinking water, or in food, or in both.

When it is desired to employ the dextrorotatory isomer in pure or relatively pure form, it is usually most advantageous to prepare the desired optical isomer de novo rather than to separate it from the racemic mixture. Several methods for preparation of either of the two optical isomers in the substantial absence of the other are known. The method of Baer and Fischer, published in the Journal of the American Chemical Society, volume 70, pages 609–10 (1948) is advantageous. The reported values of optical rotation of the enantiomers differ widely. The differences in results obtained by different workers appear to be due in part to the relative freedom of the intended optical isomer from the optical isomer of opposed sign and the probability that the present substances form some kind of hydrate with water which has optical properties appreciably different from the anhydrous form. Thus, dextrorotatory values ranging as widely as $+3.25$ to $+20.1$ degrees have been reported.

When the laevorotatory isomer is desired for comparison or because of its relaitve absence of ataractic activity, it may be synthesized in various manners. One advantageous method is the method of Levene and Walti in Organic Syntheses, collective volume II (John Wiley and Sons, New York, 1943), page 545 and following.

It is to be noted that either optical isomer in relatively pure form is very much more expensive than the racemic mixture which is commonly marketed as commercial "propylene glycol." The racemic mixture is, in fact, a mixture of the dextrorotatory and laevorotatory forms and does not contain (and theoretically cannot contain) individual molecules possesing both dextrorotatory and laevorotatory properties which, if they existed, might combine the distinctive physiological properties of the two stereo isomers in the same molecule.

The present ataractic agent is, in relatively pure form, a bland, faintly sweet, slightly viscous, colorless liquid usually unobjectionable to the taste and relatively palatable in unmodified form. This form has been used sucessfully and may be used to obtain the advantages and benefits of the present invention. The racemic mixture of optical isomers of the ataractic agent of the present invention has similar properties and, if desired, may be employed in unmodified form, allowance being made for its relative proportional content of the active dextrorotatory isomer. However, propylene glycol, disregarding optical properties present, is known to be a highly effective solvent for a wide range of coloring and flavoring substances as well as other materials, and to be soluble in all proportions in water. Therefore, when desired, the present ataractic agent may easily be combined with other substances whereby it is colored, flavored, or in other ways modified for useful exhibition. Also, it may be dispersed in and on an inert solid or may be enclosed in a capsule of a substance soluble in fluid normally present in the animal digestive system or in a selected region thereof but not in the glycol itself; such solid preparations may then be tableted or otherwise prepared for use. Also, the present ataractic agent may be dispersed in water which may be drinking water or may be dispersed in unmodified or modified form over foods and feedstuffs whereby the normal ingestion of food or water occasions medication.

Because of the low toxicity of the present ataractic substance, dosage may be varied within wide limits. As is common with medicaments, and with substances acting in any way upon the nervous system in general, there appears to be a threshold or lower limit dosage below which the ingestion of the present ataractic agent is without observable ataractic or other physiological effect. It is believed that this accounts for the fact that, although use of racemic propylene glycol has been very widespread as a solvent, carrier, vehicle and the like, in substances of wide variety over many years, the method of the present invention has not hitherto been known. Thus, for example, propylene glycol in relatively small amounts is a common constituent of such flavoring agents as vanilla extract. However, when thus employed, amounts of vanilla extract so great that the flavoring constituents thereof would have undesirable or toxic effect would have to be ingested in order to constitute sufficient dosage with the present ataractic agent to observe even minimal phenomena. Similarly, racemic propylene glycol has been widely employed in other applications as a solvent or carrier but always in such dilution as to render highly improbable even the accidental ingestion of minimal amounts necessary to effect the ataraxis which is produced in the present process.

The precise minimum or threshold dosage to be employed to obtain the benefits of the present invention is, in common with pharmaceutical applications of substances, generally subject to variation depending upon the individual situation. For example, when it is desired to diminish the responsiveness to alien stimuli of an animal in a quiescent or restful state, relatively small amounts are usually satisfactory. In contrast, when it is desired to calm an excited animal, especially an animal of inherently excitable temperament, relatively larger amounts may be necessary. As is well known to those skilled in the arts of pharmacology, the factors to be considered in estimating appropriate minimal dosages include the size of the animal involved, the inherent excitability of the animal involved, the state of excitement of the animal at the time medication is initiated, alternative medication simultaneously administered together with such other known factors as, for example, presence or absence of known disease, metabolic rate especially if anomalous, species response, and the like.

In general, with a subject animal to be medicated under relatively favorable conditions, when the need for ataraxis is foreseen at a time when the anxiety to be controlled is not beyond its incipient state, the employment of approximately 0.25 gram of the dextrorotatory isomer of propylene glycol per kilogram body weight of animal to be dosed results in mild but effective ataraxis. The effects are usually noted within a few minutes and persist over a period of a few hours after which they disappear. The entire course of the ataraxis is pharmacologically unobjectionable, and in time the animal returns to normal without evident sequelae. The employment of such minimal dosages occasions only minor to negligible disturbance of coordination, muscular control, capacity for intellectual concentration and the like. When it is desired to provide the advantages and benefits of the present invention upon a somewhat less tractible subject or when the undesired anxiety has begun to be manifest, or when it is desired to induce ataraxis of a somewhat more pronounced degree, a larger dosage may be employed. In such situation, the employment of approximately 0.5 gram of the active dextrorotatory isomer of propylene glycol per kilogram body weight of an animal to be dosed results in the prompt induction of a relatively well defined ataraxis of which the associated effects include mild disorders in coordination and cerebral function, reduced capacity to concentrate, and generalized euphoria.

When the subject animal to be treated is in an excited state or is extremely susceptible of injurious levels of excitement, and when the excitement is to be controlled promptly by the administration of the ataractic agent of the present method, larger doses may be employed successfully and safely, such as, for example, doses up to 2 or 3, or in extreme cases, even as high as 5 grams of the active dextrorotatory isomer of propylene glycol per kilogram body weight. The administration of such doses usually results in the quite prompt induction of an advanced ataractic state, incident to which muscular discoordination is evident, apprehension and anxiety are almost totally eliminated, and if the subject of the treatment is naturally tired or otherwise susceptible of falling asleep, sleep closely resembling natural sleep but usually of relatively short duration may ensue. Sensitivity to stimuli including notably stimuli occasioning anxiety is sharply reduced. The animal enjoys a generalized sense of well-being including a sense of warmth at the extremities, and mild analgesia.

As is commonplace in the employment of pharmaceutical substances, generally the employment of great excesses of the ataractic agent of the present invention is to be avoided. The ataractic dextrorotatory isomer is apparently not more toxic than the racemic mixture of which the toxicity has been studied in great detail. As long ago as 1942, the publication "New and Non-Official Remedies" of the American Medical Association pronounced propylene glycol virtually non-toxic. The $LD_{50}$ for rats has been tentatively established at between 25 and 30 grams per kilogram, amounts so great that the mechanical embarrassment of the digestive tract becomes a distinctive component of the toxic syndrome thus induced. In the instance of physiological peculiarities rendering the treated animal unusually susceptible to the present ataractic agent, it is unlikely that ingestion of dangerous amounts could occur even accidentally. However, in order to maintain a generous margin of safety, the administration of single doses in amounts in excess of one percent of the body weight of the animal treated is contraindicated. It is believed highly unlikely that antidotal treatment will be required of the practitioner administering the present ataractic material but such treatment is essentially symptomatic, if necessary. Chronic toxicity of or habituation to the present ataractic substance are unknown; recovery from pharmaceutical or toxic ingestions of propylene glycol is complete and believed to be without complications.

The practice of the present invention is more fully set forth in the following illustrative examples:

*Example 1*

A feral adult male Norway rat (*Rattus norvegicus*) is to be examined for external parasites of which specimens are to be collected. It is desired to avoid anesthesia. The rat is weighed in a tared cage and found to weigh 300 grams. The rat is starved for 12 hours and then offered a meal of laboratory mash based upon finely ground grain, which is first moistened by the addition thereto of 0.3 gram of the essentially pure dextrorotatory isomer of 1,2-propanediol. Water ad lib is also offered. The entire meal is eaten and a moderate amount of water drunk. Within 30 minutes after the eating of the said meal, the rat becomes noticeably less agitated and does not seek egress from its cage. In this condition, the animal is removed and a further 0.3 gram portion of the dextrorotatory isomer of 1,2-propanediol is forcibly administered per os. Fifteen minutes thereafter, the rat is removed from its cage and searched for dermal parasites. The animal is conscious and apparently in possession of normal faculties but its reflexes appear to be slower and its muscular coordination and, concomitantly, its equilibration appear to be impaired. Search of the animal and aspirational removal of parasites continues for 15 minutes without eliciting hostile or anxious reactions from the animal. When the animal is dropped dorsally through a distance of approximately three times its trunk diameter to a surface, it does not reflexly right itself while falling.

Upon completion of the parasite removal, the animal is restored to its cage and maintained under normal conditions thereafter. On the following day, all its responses are apparently normal.

In a second procedure, the same steps are carried out but the employed substance is optically inactive commercial propylene glycol. Ataraxis is evident but does not achieve the depth manifest as result of the previous procedures. The animal cannot conveniently be handled.

In a third procedure, essentially the same steps are carried out except that the employed substance is essentially pure laevorotatory 1,2-propanediol. No ataraxis or other evident physiological effect is noted. The animal is not more manageable after ingestion of the said diol than before.

In all cases, the animals return to normal without evident sequelae.

*Example 2*

In a professional exhibition of commercial cage-reared fur-bearing animals such as mink, it is desired to enable the judges to handle and examine the mink freely to ascertain depth and quality of pelage, body conformation, uniformity of color, and other factors pertinent to the deliberations of the judges. The unmodified habits of the mink renders such examinations difficult and dangerous. Handlers may be bitten, and the mink may bite through gloves of any thickness which, when worn, permit the wearer sufficient dexterity for assured manipulation of the mink. Also, the shrill cries of anger of the mink convey to other animals a sense of agitation and uneasiness. Finally, the animal may escape during such handling.

The difficulties are greatly reduced or eliminated by the practice of the present invention. Specifically, the ground fresh meat food offered to the mink (consisting primarily of slaughterhouse offal below requisite standards for human consumption, incompletely cleaned and ground) is modified by the addition thereto, after grinding, of the dextrorotatory isomer of 1,2-propanediol in an amount sufficient that, with the ingestion of ordinary amounts of food, the mink will take in from 1.5 to 4 grams of the said diol substance per kilogram body weight of mink. An adult mink usually weighs more than 0.45 kilo but not so much as 1.8 kilos. Males are typically larger and heavier than females. However, the medication of the said meat is not difficult because the precise amount of the said diol substance ingested is not critical so long as it is at least a physiologically effective amount but not so much as to cause toxic effects. Moreover, normally, the larger animals tend to eat more heavily.

Feeding of the ground meat containing the said diol substance is begun from a half hour to two hours prior to the time when the animals are to be examined. Thereafter, during examination, the mink which has eaten normal amounts of food are quiet, tractible, do not try to bite their handlers or otherwise defend themselves, and make no outcry. They make only feeble attempts to right themselves when inverted for examination of ventral surfaces. The induced ataraxis gradually diminishes and at some subsequent time disappears. By the following day, the behavior of the animals is in all respects normal.

*Example 3*

The hair is to be harvested from a group of Angora rabbits for use in textile fiber spinning. In the present example, the rabbits have been newly relocated to unfamiliar surroundings. Whereas, normally, the rabbits are docile, and the hair is harvested by placing the animals upon a table or other convenient support and "stroking" them to free and remove the long hairs, in the present situation, the animals are apprehensive and, when liberated from confinement, attempt to escape.

The animals weigh about 2 kilograms each. About a half day before the hair is to be harvested, the animals are offered food moistened with d-1,2-propanediol. The amount of the said diol is adjusted according to the known normal food intake of the animals to cause each animal to ingest, over a period of approximately 4 hours, about 0.2 gram of the said diol. The animals become substantially less agitated and, at the end of the said half day, readily remain in an assigned place during harvest of the said hair. Within 24 hours, all evidence of the ataraxis has disappeared.

It is well known that forcible ingress into natural body openings, especially where dilatation of a sphincter is involved, occasions anxiety and agitation in the animal thus treated. Medication according to the present invention is effectively used, according to the dose employed, to reduce such anxiety and, especially in conjunction with appropriate restraints, to permit such ingress, especially in situations in which it is not usually painful. Thus, when it is desired to induce euthanasia in the horse through severing of the posterior aorta anterior to its bifurcation into the iliac arteries, the anxiety usually accompanying the necessary incidental dilatation of the anal sphincter may be greatly reduced. Similarly, such techniques as that of Miller and Exans (Journal of Agricultural Research, volume 48, page 941) and other manipulative, palpative, and sub-surgical techniques requiring sphincter dilatation may be performed with the occasion of a minimum of anxiety and commotion by the timely employment, therewith, of the practice of the present invention.

The practice of the present invention is successful with warm-blooded animals generally, but certain limitations will be well understood by those versed in pharmacology and the physiological action of medicinal and drug substances. In particular, when employing the present invention in tranquilizing ruminants, the condition of the rumen is important or even critical. When the rumen is crowded with ingesta, the chemical identity and behaviour of such ingesta, their sorptive capacity and the activity of rumen flora will be important. When it is desired to achieve prompt and thorough tranquilizing of a ruminant, the rumen should be uncrowded or even essentially empty.

Species differences are appropriately observed. Thus, for example, among chickens, it is important to induce the ataraxis available in the present invention in the instance of nervous birds such as the White Leghorn or the Black Minorca or various of the bantams before such birds are exposed to agitating stimuli. In contrast, the naturally more calm birds such as the White Wyandotte, the Rhode Island Red, and the Barred Rock tend to respond more readily to the medication of the present sort. Medication of birds is conveniently carried out by administering the medicament, presently d-1,2-propanediol, in drinking water. Similarly, cats of nervous breeds such as the Siamese, and dogs of excitable temperaments such as the Chihuahua, and like nervous and excitable animals respond better if, in addition to the present medication, stimuli may also be held to a minimum. However, the present method appears in some way to be effective in bringing about the tranquilizing of or maintaining, through disturbing stimuli, the tranquility of warm-blooded animals generally including mammals and gallinaceous animals.

We claim:
1. A method of tranquilizing a warm-blooded animal in a state of at least incipient excitement which comprises the step of administering to such animal propylene glycol in a non-toxic amount sufficient to contain at least 0.25 gram of the dextrorotatory optical isomer of 1,2-propanediol per kilogram body weight of the said animal.
2. The method of claim 1 in which the glycol is supplied as a mixture of the dextrorotatory and laevorotatory optical isomers.
3. The method of claim 1 in which the glycol is supplied as a racemic mixture of the dextrorotatory and laevorotatory optical isomers.
4. The method of claim 1 in which the glycol is supplied as the essentially pure dextrorotatory isomer.
5. The method of claim 1 wherein the said glycol is administered in drinking water.
6. The method of claim 1 wherein the said glycol is administered in food.

References Cited by the Examiner

UNITED STATES PATENTS

| | | | |
|---|---|---|---|
| 2,874,190 | 2/59 | Goldberg | 167—65 |
| 2,883,402 | 4/59 | Magerlein | 167—65 |
| 2,970,144 | 1/61 | Zirkle | 167—65 |
| 2,973,365 | 2/61 | Janssen | 167—65 |
| 2,986,564 | 5/61 | Rips | 167—65 |

OTHER REFERENCES

Baer, J.A.C.S., vol. 70, pp. 609–610, February 1948.
Bennett, J. Am. Pharm. Assoc., Pract. Ed., vol. 18, No. 11, November 1957, p. 665.
Berger, J. of Pharm. and Exptl. Therap., vol. 104, pp. 229–233, 1952.
Berger, J. of Pharm. and Exptl. Therap., vol. 105, pp. 450–457, 1952.
Berger, J. of Pharm. and Exper. Therap., vol. 116, No. 3, pp. 337–342, March 1956.
Braun, Fed. Proc., vol. 17, No. 1, March 1958, p. 353.
Brown et al., J. Pharm. and Exptl. Therap., vol. 115, pages 230–9, 1955.
Carter, Antibiot. Med., and Clin. Therap., vol. 5, No. 11, p. 675, November 1958.
Chem. Eng. News, vol. 35, Aug. 19, 1957, pp. 14–17.
Goldstein, J. Am. Pharm. Assoc., Pract. Ed., vol. 18, No. 2, February 1957, pp. 92–96.
Hollister, Annals of Internal Medicine, vol. 51, No. 5, November 1959, pp. 1032–1048, especially p. 1035 and pp. 1039–1040.
Kautz, J.A.M.A. Council on Drugs, March 1, 1958, vol. 166, No. 9, pp. 1040–1.
Leven, J. Biol. Chem., vol. 67, pp. 329–332, 1926, and vol. 73, pp. 263–274, 1927.
Shaw, The American J. of Medical Science, vol. 237, No. 2, pp. 141–150, especially p. 143, February 1959.

JULIAN S. LEVITT, *Primary Examiner.*

WILLIAM B. KNIGHT, MORRIS O. WOLK, FRANK CACCIAPAGLIA, Jr., LEWIS GOTTS, *Examiners.*